P. GANZHORN.
FINGER GUARD FOR MEAT CHOPPERS.
APPLICATION FILED MAR. 27, 1913.
1,066,723.
Patented July 8, 1913.
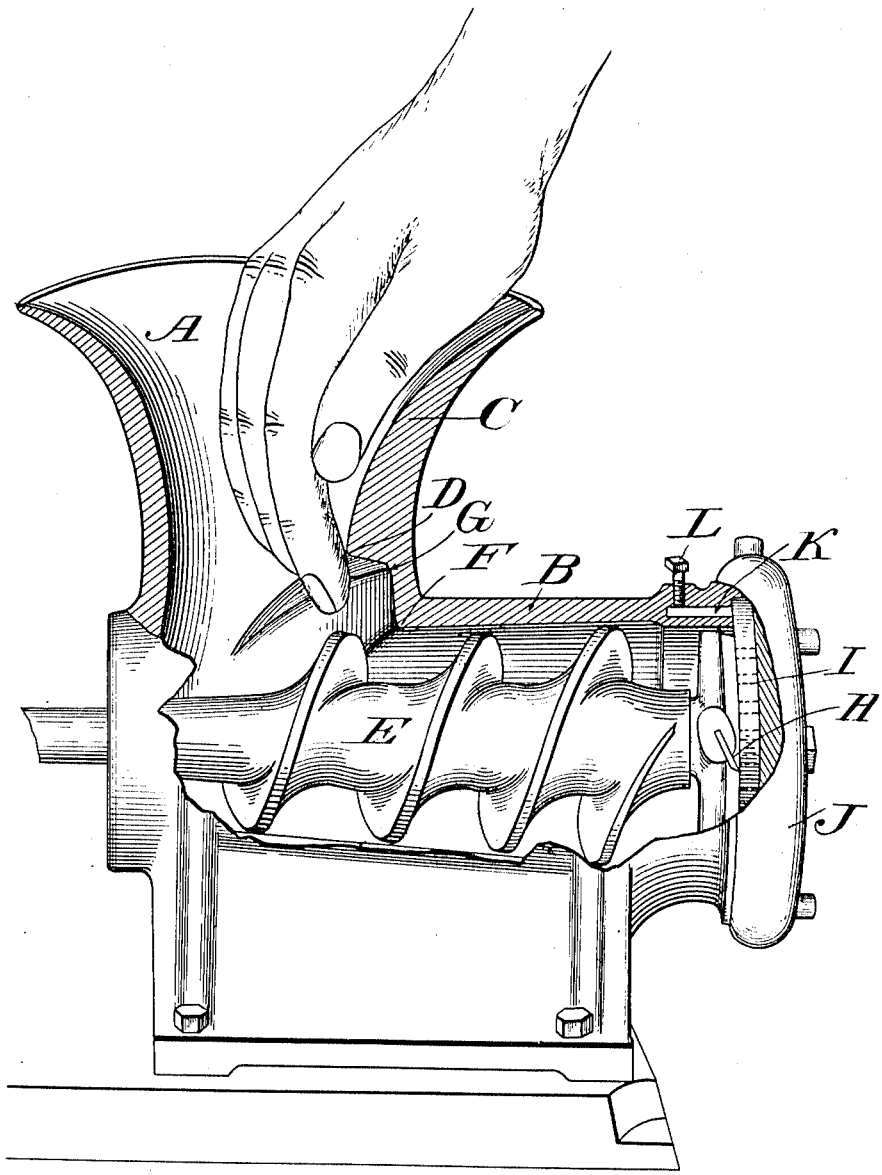
Witnesses
C. N. Walker.
Edith Smith
Inventor
Philip Ganzhorn
By Geo. E. Tew
Attorney

UNITED STATES PATENT OFFICE.

PHILIP GANZHORN, OF CHICAGO, ILLINOIS.

FINGER-GUARD FOR MEAT-CHOPPERS.

1,066,723.      Specification of Letters Patent.      Patented July 8, 1913.

Application filed March 27, 1913. Serial No. 757,226.

*To all whom it may concern:*

Be it known that I, PHILIP GANZHORN, a citizen of the United States, residing at Chicago, in the county of Cook and State of Illinois, have invented certain new and useful Improvements in Finger-Guards for Meat-Choppers, of which the following is a specification.

My invention relates to a novel construction in a hopper or feed spout for meat chopping machines and the like, and has for its object to provide a device of this character in which means are provided for preventing the fingers of the operator from being caught between the walls of the barrel and the peripheral edge of the helix for forcing the meat to be chopped through the barrel.

The invention consists in the features of construction and combinations of parts hereinafter fully described and claimed.

The accompanying drawing is a partial sectional view of a meat chopper having a feed hopper provided with a finger guard constructed in accordance with my invention.

In the operation of meat choppers in meat markets, sausage factories and the like, the operator is usually forced to press the meat to be chopped into the barrel and into engaging relation to the screw shaft or helix which conveys the same forcibly through the barrel toward the cutting means. Owing to the resistance offered at the delivery end of the barrel by the perforated plate through which the meat must be forced it is not infrequent that the smaller pieces back up toward the inlet end of the barrel so that in order to prevent such return movement the operator is obliged to exert a pressure upon the contents of the feed hopper. In so doing it not infrequently happens that the operator inserts his fingers so far into the feed hopper as to thrust them into the barrel and they are then liable to be caught between the helix or screw shaft and the corner at which the barrel connects with the hopper with the result that such fingers are mashed and frequently cut off.

To obviate this difficulty and prevent such accidents is the object of the present invention and is effected by providing within the hopper A and on the wall thereof which connects with the barrel B between the ends, as indicated at C, a V-shaped projection or hump D which serves to contract the discharge end portion of the hopper A and prevent the finger of the operator from being thrust into the barrel at a point where the same may be caught between the first convolution of the helix or screw shaft E and the corner F formed by the juncture of the wall C of the hopper with the barrel B. The said hump D is preferably formed by casting the hopper with the hump thereof. It will be noticed that the hump is spaced above the periphery of the screw, forming a recess G of sufficient size to receive the ends of the fingers of the operator, the corner or edge F being thus set back or in such a distance that the fingers cannot project in far enough to be caught between said corner and the convolution of the screw. If by any circumstance the hand is inserted to contact with the screw, it will simply cause the fingers to bend naturally up and back into the recess G, at the first joint of the fingers. The recess is so shaped and disposed with respect to the thread of the screw that it will accommodate the ends of the fingers, and although the fingers may be drawn in by the screw they will not be caught but will simply be pressed back into the recess which is of sufficient size to prevent any pinching or mashing, and so it will be practically impossible for an operator to get his fingers in far enough to be caught between the screw and the corner F of the barrel.

In machines of this type the meat is cut by knives H working against a perforated plate I held by a clamping ring J at the end of the machine, and the plate is prevented from turning by a pin K which fits in a notch in the edge of the plate and sets in a hole in the end of the barrel. It is customary to wedge this pin in, but I hold it in by a screw L, so that it can be easily taken out or put in by loosening the screw.

What I claim as new is:

1. In a meat cutting machine, the combination of a barrel and a screw rotating therein, of a hopper leading to the barrel, the hopper having a hump on the side thereof spaced from the periphery of the screw, at the entrance to the barrel, forming a recess extending inwardly under the hump to the point at which the screw enters the bore of the barrel.

2. In a meat cutting machine, the combination of a barrel and a screw rotating therein, of a hopper leading to the barrel, the hopper having the hump D on the side thereof toward the entrance end of the barrel, the hump being spaced above the screw and forming a recess G thereunder extending to the corner F at which material will be engaged between the barrel and the screw.

In testimony whereof, I affix my signature in presence of two witnesses.

PHILIP GANZHORN.

Witnesses:
EDITH L. SMITH,
GEO. E. TEW.